P. RIESS & D. LEMLEY.
RANGE.
APPLICATION FILED AUG. 23, 1909. RENEWED OCT. 27, 1910.
993,715.
Patented May 30, 1911.
2 SHEETS—SHEET 1.
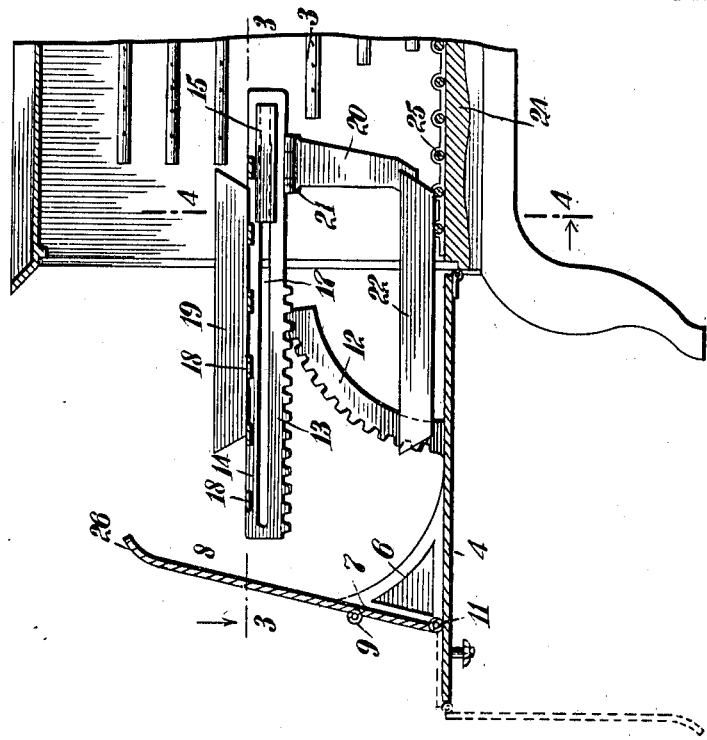
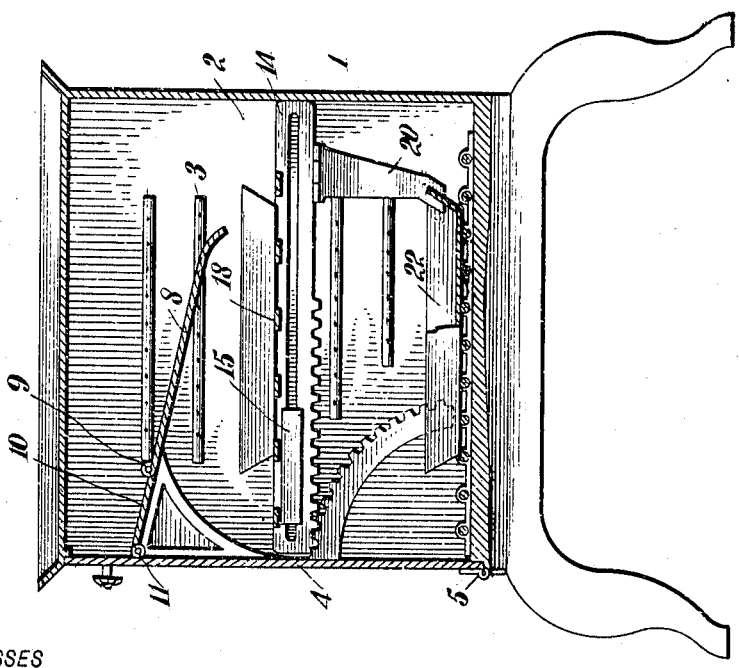
WITNESSES
INVENTORS
Paul Riess
David Lemley
BY
ATTORNEYS

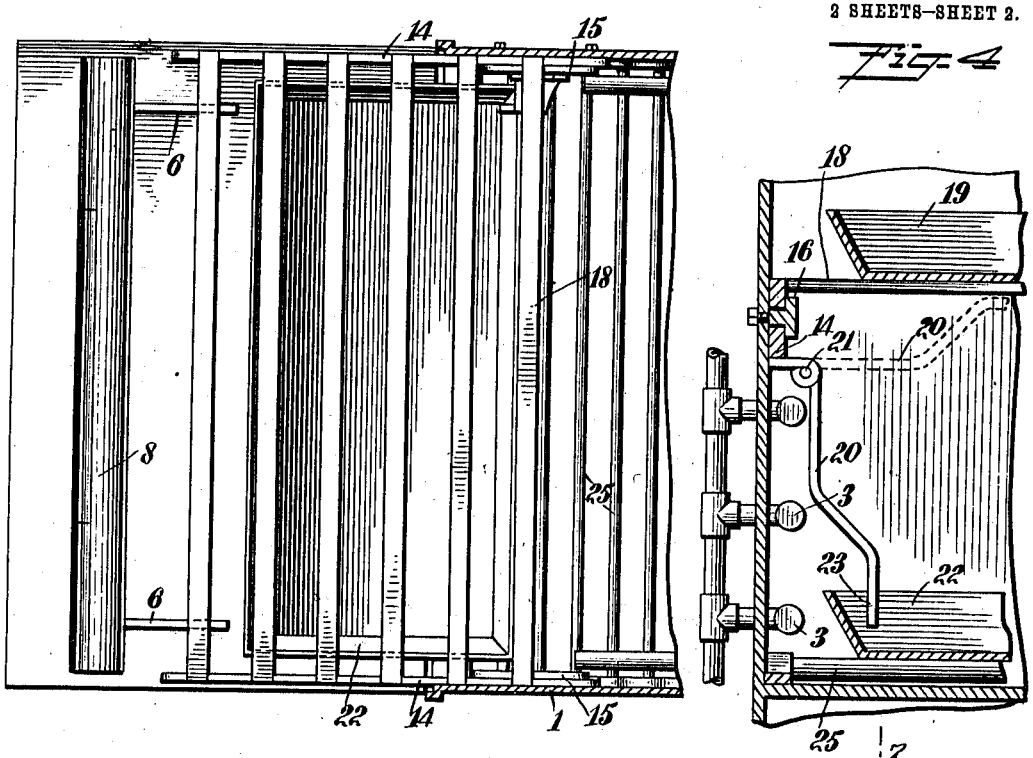
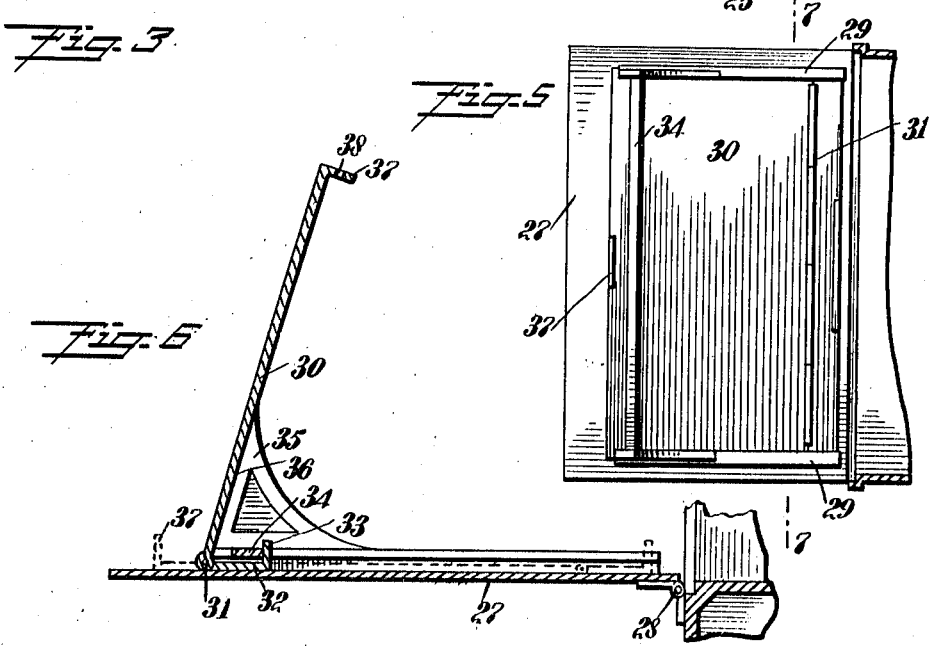

UNITED STATES PATENT OFFICE.

PAUL RIESS AND DAVID LEMLEY, OF NEW ORLEANS, LOUISIANA.

RANGE.

993,715.     Specification of Letters Patent.     Patented May 30, 1911.

Application filed August 23, 1909, Serial No. 514,111. Renewed October 27, 1910. Serial No. 589,423.

*To all whom it may concern:*

Be it known that we, PAUL RIESS and DAVID LEMLEY, both citizens of the United States, and residents of New Orleans, in the parish of Orleans and State of Louisiana, have invented a new and Improved Range, of which the following is a full, clear, and exact description.

This invention relates to stoves or ranges such as used for cooking.

The invention is particularly applicable to ranges having ovens in which food may be roasted or baked.

The object of the invention is to provide an arrangement whereby the cook on opening the oven is protected from the heat. In addition to this the device is constructed in such a way that the pans in which articles of food are being roasted will advance automatically out of the oven when the door is thrown open. This arrangement is particularly useful where it is necessary to baste the article which is being roasted.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a vertical section through an oven constructed according to our invention, in a front and rear plane, this view showing the oven door closed; Fig. 2 is a view similar to Fig. 1, but showing the oven door thrown open and the pans advanced out of the range, in this view the rear portion of the range is broken away; Fig. 3 is a horizontal section taken on the line 3—3 of Fig. 2; Fig. 4 is a vertical section taken on the line 4—4 of Fig. 2, but showing only one side of the range; Fig. 5 is a plan showing a modified form of the device; Fig. 6 is a vertical section taken through an open oven door and further illustrating the modified form shown in Fig. 5, this view showing a small portion of the range; and Fig. 7 is a horizontal cross section on the line 7—7 of Fig. 5.

Referring more particularly to the parts, and especially to Figs. 1 to 4, inclusive, 1 represents the body of the range, the interior of which constitutes an oven 2. This oven may be heated by gas which flows through tubular burners 3 arranged along the side walls of the oven, as indicated. On the forward side the oven is provided with a door 4 which is attached at its lower edge by means of a hinge 5 which permits the door to be swung down to a substantially horizontal position, as shown in Fig. 2. On the inner side of this door near the upper edge thereof and near the side edges, we provide brackets 6, and these brackets present inclined edges 7 which are adapted to support a shield 8, which shield is formed of a plate, as indicated, having a hinge joint 9 which extends transversely thereof. Beyond the joint 9 a segment 10 of the plate constitutes a knuckle plate, and this part 10 is connected by a hinge joint 11 to the inner face of the door 4 and adjacent to the upper edges of the brackets. The arrangement is such that when the door is in its closed position the shield 8 is disposed completely within the interior of the oven, but when the door is pulled out or opened, as indicated in Fig. 2, the shield 8 extends upwardly in front of the oven and operates to protect the face of the person opening the door.

In order to advance the pans within the oven, we provide the side edges of the door 4 with segments 12, the centers of which are on the axis of the hinge 5. The teeth of these segments 12 mesh with the teeth of racks 13 which are formed on the under sides of rack bars 14. These rack bars 14 are guided to slide horizontally by means of guide brackets 15 which are attached to the side walls of the range, as indicated. These guide brackets 15 present a T-cross-section, as shown in Fig. 4. In this way they present upwardly and downwardly projecting flanges 16 which operate to retain the rack bars, the said rack bars being provided with longitudinal slots 17 which receive the reduced bar of the bracket. The rack bars 14 are connected by a plurality of horizontal slats 18, and these slats are adapted to support a pan 19, as shown. When the oven door is opened the segments pull the racks so as to advance the upper pan 19 from the range, as indicated in Fig. 2. On one of the rack bars, preferably the one at the left of the stove, as viewed from the front, an arm 20 is attached by means of a hinge connection 21, and this arm extends down into the lower part of the oven and is formed with a bifurcated grapple 23 which is adapted to engage the rear edge of the lower pan 22, as indicated. The bottom 24 of the oven is provided with a plurality of rollers 25 which are disposed transversely, and these rollers support the lower pan 22, as will be readily understood. When the door is opened the arm 20 pushes out the lower pan 22, and it will also pull the pan inwardly again when the door is closed. In this way the segments 12 operate to advance both the upper and lower pans out of the oven so that the food cooking in the pans can be easily reached.

If it is desired to hold the oven door in a substantially horizontal position, this may be effected by means of the knuckle plate 10. The knuckle plate will then lie upon the upper side of the open door and the plate 8 will hang down so that its normal inner edge will rest upon the floor. The inner edge of the plate 8 is bent so as to form a curved nose 26 which facilitates its passing in and out of the open doorway. By reason of the hinge connection 21 it is possible to raise the arm 20 to an elevated position, as indicated by the dotted lines in Fig. 4, and the arm may be swung upwardly toward this position when it is desired to disengage it from the pan.

In Figs. 5, 6, and 7, we illustrate a modified form of the invention. In this form of the invention the oven door 27 is attached by a hinge connection 28, as in the preferred form. Near the side edges of the door we provide guide cleats 29, under which may project the side edges of a shield plate 30. This plate 30 is pivotally attached at 31 to a slide plate 32, the edges of which are guided under the cleats as will be readily understood. The rear edge of the slide plate 32 is provided with an upwardly projecting toe 33, and this toe limits the forward movement of the plate when being slid outwardly by striking against the rear edge of a stop bar 34 which extends across the inner side of the door, as shown. Near the side edges of the door we provide brackets 35 having inwardly projecting edges 36 which support the shield 30 in a rearwardly inclined position when the door is opened. When it is desired to close the door, the plate is swung forwardly until it comes into a slightly horizontal position, and it is then slid back on the upper face of the door so that the side edges of the plate 30 run under the cleats. Of course when the shield is swung upwardly to the position in which it is shown in Fig. 6, the hinge joint 31 is beyond the cleats so they do not interfere with the upwardly swinging movement of the shield. The upper or outer end of the shield is provided with an upwardly projecting toe 37 which is provided with an opening 38, as indicated. With this form of the invention the shield does not project into the interior of the oven, but normally lies folded on the inner side of the door, however, when the oven is opened the shield can be extended and set up in the manner described.

Having thus described our invention, we claim as new and desire to secure by Letters Patent,—

1. A range having an oven with a hinged door adapted to be swung open, said range being adapted to support pans on the interior thereof to receive food, automatic means for advancing the pans from the oven when said door is swung open, a shield carried by said door normally disposed within the oven and adapted to take a position which will give protection from the heat of the oven, and means carried by the door for supporting the shield in said position.

2. A range having a door adapted to swing open and downwardly, a shield attached to the inner side of said door, and means for supporting said shield in an upwardly projecting position when said door is opened.

3. A range having an oven and having a door adapted to swing outwardly and downwardly, brackets attached to the inner side of said door, and a shield having a hinge connection on the inner side of said door and adapted to be supported by said brackets in an upwardly inclined position when said door is opened.

4. A range having an oven, a swinging door for the oven, a member adapted to support a pan and guided to slide in and out of said oven, the said member having rack teeth, and segments carried by said door and having teeth meshing with said rack teeth.

5. A range having an oven and a swinging door, a sliding member guided to slide on said range, means for sliding said sliding member outwardly when said door is opened, a pan mounted in said oven, and an arm having a joint connection with said sliding member and provided with a bifurcated end adapted to engage the edge of said pan to advance the same.

6. A range having an oven with a swinging door, rack bars guided to slide in and out at the sides of said oven, segments carried by the door and meshing with said rack bars and affording means for sliding the same in and out, means for supporting a pan on said rack bars, and an arm attached to one of said rack bars and normally extending downwardly in the interior of the oven and adapted to engage a pan to advance the same from the lower part of the oven.

7. A range having an oven with a swinging door, bracket plates attached to the inner side of said door and having inclined supporting edges, a shield comprising a main plate and a knuckle plate, and a hinge connection between said knuckle plate and said main plate, said knuckle plate being movably attached to the door adjacent to the bracket plates and adapted to rest upon the upper side of the door when said door is swung downwardly into a substantially horizontal position, said main plate being adapted to extend downwardly and present its outer edge to the floor.

8. A range having an oven provided with a door hinged at its lower edge, brackets attached to the inner side of the door at the upper part and near the side edges thereof, the said brackets having inclined edges, and a shield comprising a plate connected with said door and adapted to be supported on said inclined edges of the brackets when the door is in the open position.

9. A range having an oven adapted to support pans on the interior thereof, a door for said oven, means for advancing the pans from the oven when the door is opened, a shield movably connected with the inner side of the door, and brackets on the door having inclined supporting edges for supporting the shield in an upwardly inclined position when the door is opened.

In testimony whereof we have signed our names to this specification in the presence of two subscribing witnesses.

PAUL RIESS.
DAVID LEMLEY.

Witnesses:
JOHN F. FINKE,
CHAS. N. KEHL.